United States Patent [19]

Montanari

[11] 3,951,247

[45] Apr. 20, 1976

[54] ELECTROTHERMAL PRINTING UNIT

[75] Inventor: Lucio Montanari, Cascinette (Turin), Italy

[73] Assignee: Ing. C. Olivetti & C., S.p.A., Ivrea (Turin), Italy

[22] Filed: Nov. 29, 1974

[21] Appl. No.: 527,976

[30] Foreign Application Priority Data

Dec. 28, 1973 Italy .................................. 70877/73

[52] U.S. Cl. .................................................. 197/1 R

[51] Int. Cl.² .......................................... G01D 15/10

[58] Field of Search .................. 197/1 R; 101/93.04; 219/216; 346/76 R

[56] References Cited

UNITED STATES PATENTS

| | | | |
|---|---|---|---|
| 3,139,026 | 6/1964 | Meckstroth et al. | 101/93.04 |
| 3,161,457 | 12/1964 | Schroeder et al. | 197/1 R X |
| 3,354,817 | 11/1967 | Sakurai et al. | 101/93.04 |
| 3,509,980 | 5/1970 | Loughry et al. | 197/1 R |
| 3,810,192 | 5/1974 | Okabe | 101/93.04 X |
| 3,845,850 | 11/1974 | Herr et al. | 197/1 R |
| 3,855,448 | 12/1974 | Hanagata et al. | 197/1 R X |

*Primary Examiner*—Wm. H. Grieb
*Attorney, Agent, or Firm*—I. J. Schaefer

[57] ABSTRACT

An electrothermal printing unit for writing dots matrix characters on a thermosensitive paper comprises a print head carrying a plurality of thermo-activable printing elements aligned along a printing line of the recording medium.

The head is reciprocated in a direction parallel to the printing line of the recording medium. The recording medium is moved incrementally perpendicular to the direction of a line of printing in synchronization with the movement of the head and control means are provided for selectively activating the printing elements at a succession of positions of the head in each of a succession of strokes thereof in an arrangement such that each element print all the points of at least one character of the line of characters during the succession of strokes.

7 Claims, 8 Drawing Figures

ELECTROTHERMAL PRINTING UNIT

BACKGROUND OF THE INVENTION

The present invention relates to an electrothermal printing unit of an improved kind for impact-less typing of alphanumerical characters, in accordance with point matrices, on to a heat-sensitive recording medium. In this specification "row" refers to a row of points of a row and column matrix in contrast to "line" which refers to a line of characters, a row being parallel to a line.

For efficient utilization of the speed of modern systems of electronic information handling it is essential to have available very high-speed peripheral printing units, and it is also desirable that the printing units should not be too numerous, since they are normally located near the user, in offices and other working places. The number of units required depends on the output of each unit.

The use of printing equipment with ballistic impact of a character-bearing member against an inked ribbon in contact with paper involves speed limitations intrinsic in the mechanical operation and noise levels which often reach the limits of toleration, but the introduction of impactless printing equipment removes these drawbacks.

Impact-less printing devices are known which make use of the electrothermal typing method. For example, U.S. Pat. No. 3,839,630 to E.E. Olander et al, relates to an electrothermal line printer, i.e. designed to type simultaneously a complete line of characters by means of point matrices, on to a heat-sensitive recording medium.

It comprises a printing head which carries, aligned in parallel to the printing line, as many thermally-activable printing elements as there are characters in a line of print, multiplied by the number of points constituting a row of each matrix. For example, if the matrix is of the kind having 7 rows × 5 columns and with a line of print having 16 characters, the number of elements required is 16 × 5 = 80 elements.

The head, during elementary printing act, carries out the typing of a row of matrix points for all the characters in a line of print. Complete printing of a row of characters therefore requires as many elementary printing acts as there are points in a column of each matrix. During the elementary printing acts, the recording medium is fixed relative to the head, and carries out an interlinear elementary movement equal to the distance between two rows of the matrix after each elementary printing act.

The selection and control circuits must therefore be designed to control a number of printing elements equal to a multiple of the number of characters in a line of print. The printing speed is obviously high and mechanical control is concerned solely with interlinear movement of the recording medium. But the complexity and the number of the electronic control circuits for this kind of printing unit leads to serious electrical connection problems and above all to a very high construction cost which is not always justified by increased performance in terms of printing speed.

These drawbacks are removed by the unit according to the invention, which makes it possible to obtain a speed performance comparable with that of an electrothermal line printer of the kind described above, but using a much smaller number of theremoelements and an elctronic control circuit which is consequently much smaller.

SUMMARY OF THE INVENTION

According to the present invention there is provided an electrothermal printing unit for impact-less printing of characters in accordance with a matrix of points arranged in rows, comprising means for supporting a heat-sensitive recording medium and for moving the medium incrementally perpendicular to the direction of a line of print for printing successive rows of points, a printing head carrying a plurality of thermo-activable printing elements aligned in the said direction, means for reciprocating the head in the said direction in synchronism with the movements of the recording medium, means for signalling the position of the head, means for storing codes designating a line of characters, and control means responsive to the signalling means and the storing means to selectively activate the printing elements at a succession of positions of the head in each of a succession of strokes thereof in an arrangement such that each element prints all the points of at least one character of the line of characters during the succession of strokes.

The invention will be described in more detail, by way of example, with reference to the accompanying drawings.

DESCRIPTION OF THE PREFERRED EMBODIMENT

Figures 1, 2, 3, 4:
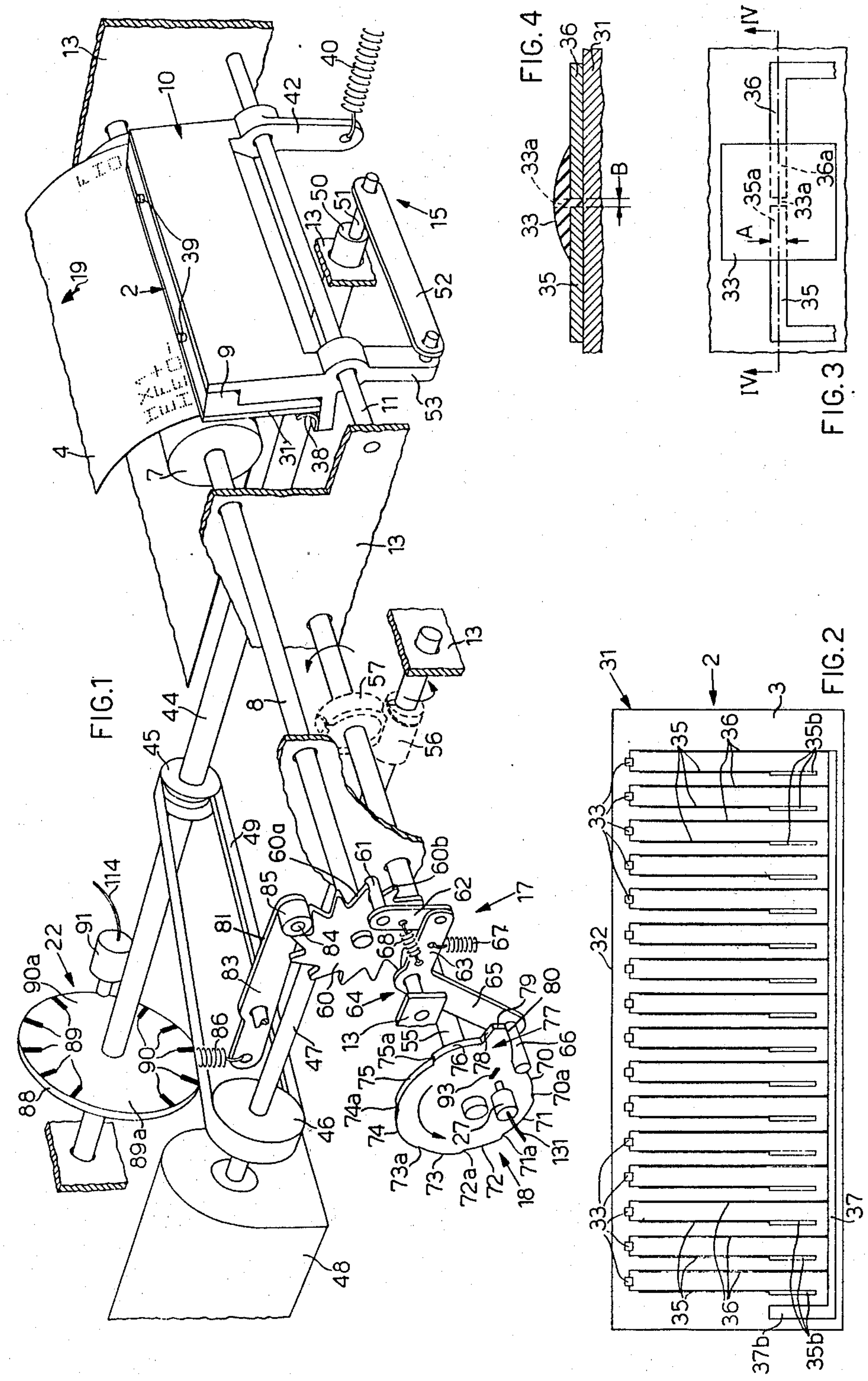
FIG. 1 is a perspective view of a printing unit embodying the invention.
FIG. 2 is a plan view of a typing head for the printing unit.
FIG. 3 shows a detail of FIG. 2.
FIG. 4 is a section on the line IV—IV of FIG. 3.

In FIG. 1 there is shown a preferred embodiment of an electrothermal printer according to the invention. This comprises an electrothermal printing head 2 (see also FIG. 2) in which printing elements 33 are positioned on the face 3 in contact with a heat-sensitive sheet 4 along its typing line. The heat-sensitive recording sheet 4 in the zone facing the head is partly wrapped on a platen 7 keyed on the shaft 8. The head is fixed on a slider 10 running along a guide 11 extending across the width of the sheet 4 parallel to the typing line and fixed, at opposite ends, to the frame of the machine, indicated generally by 13. A transport system 15 imparts a reciprocatory oscillating movement along the guide 11.

A pawl system 17 controlled by a cam 18 gives the shaft 8 an intermittent stepwise rotary movement, so that the sheet 4 is incrementally advanced by the roller 7 in the direction indicated by the arrow 19.

A sensing device 22 is designed to signal the position of the slider 10 and to furnish electrical synchronising impulses to an electronic device 30 (FIG. 5) for controlling the typing operations of the printer by selecting and timing the thermal excitation of the typing elements 33 of the head 2.

Another sensing device 27 sends a synchronizing impulse to the control device 30 for each complete rotation of the cam 18. In more detail, if we take as an example a printer designed to form lines of print composed of 16 alphanumerical characters according to the 7 × 5 point matrix (7 rows × 5 columns), the printing head 2 (FIG. 2) is composed of a rectangular plate 31 made of insulating material on which are deposited parallel to its smaller side and regularly spaced along a major side 32 of the same, sixteen pairs of conductors 35 and 36, having terminal portions 35*a* and 36*a* (FIGS. 3 and 4) near the side 12, opposite each other and of equal width.

On the portions 35*a* and 36*a* there are provided sixteen resistor deposits 33 which constitute the printing elements. The part 33*a* of the printing elements (for the resistor deposits) 33 comprised between the facing portions 35*a* and 36*a* of the conductors 35 and 36 is the only part that can be electrically, and hence thermally, activable, since the other parts of the elements 33 are short-circuited by the underlying conductors 35*a* and 36*a*. The part 33*a* is therefore rectangular in form with height A equal to the width of the ends 35*a* and 36*a*, this height corresponding to the height of the printed points intended to be obtained on the sheet 4 (e.g. A = 200μ) and with a width B, equal to the distance between the facing ends 35*a* and 36*a*, much smaller than the width of the said printed points (e.g. B = 50μ). In what follows we shall always refer to the thermally activable part 33*a* by the name "thermo-element" 33*a*. The distance between two adjacent thermo-elements 33*a* is equal to the typing step, i.e. the pitch between corresponding columns of points belonging to adjacent characters of a given line of print.

The conductors 36 are connected to a common return conductor 37. Both the conductors 35 and the conductor 37 have in addition terminal portions 35*b* and 37*b* regularly spaced on the side of the head opposite the side 32, and are designed to connect with spring contacts 38 supported by the slider 10. By means of wire connections not shown in FIG. 1, the contacts 38 are connected with the control unit 30.

The techniques, the materials of construction of the head 2, and also the advantages obtained by this type of head in typing "on the fly" on the recording medium, have been described in the copending U.S. pat. appln. Ser. No. 512,564 filed Oct. 7, 1974 assigned to the same assignee of the present invention which particularly describes a thermal print head having rectangular printing elements which produce for the combined action of their movement and the activation of the elements substantially square matrix dots and therefore will not be described herein.

The head 2 is fixed, for example by an adhesive, to a support block 9 which is fixed by screws 39 to the slider 10. As already stated, the slider is mounted to run on the guide 11 and it can also rotate around it. A spring 40 stretched between an arm 42 of the slider 10 and the frame 13 tends to turn the slider 10 counterclockwise (in FIG. 1), thus making the part of the head 2 next the edge 32 and carrying the aligned resistor elements 33, rest on the typing line of the sheet 4.

The transport system 15 of the slider 10 is composed of a shaft 44 on which is keyed a pulley 45 which is driven by a pulley 46 keyed on a shaft 47 of a motor 48, through a belt 49 which couples the two pulleys. One the end 50 of the shaft 44 there is fixed, eccentrically with reference to the axis of the same, a peg 51 on which is pivoted one end of a bar 52 whose other end is pivoted on an arm 53 of the slider 10.

The shaft 44, the peg 51 and the bar 52 constitute a system for transmission of motion of the crankshaft type, by which constant rotary motion imparted to the shaft 44 of the motor 48 is transformed into periodic reciprocating motion of the slider along the guide 11, the radial distance of the peg 51 from the axis of the shaft 44 and the length of the bar 52 being calculated so as to give an amplitude of oscillation of the slider 10, and hence of the head 2, little greater than the width of the characters that are to be obtained on a printing line (e.g. 3 mm).

As already stated, the advancing movement of the sheet 4 is effected by means of the pawl system 17, governed by the cam 18, keyed on a shaft 55 which is rotated by the motor 48 through a worm 56 and worm wheel 57. The pawl system 17 comprises a saw-toothed wheel 60 keyed on the shaft 8 and which cooperates with a peg 61 fixed to one end of a lever 62 whose other end is pivoted on an arm 63 of a lever 64 pivoted on the frame of the machine 13. To another arm 65 of the lever 64 there is fixed a peg 66, cooperating with the external profile of the cam 18 under the action of a spring 67 stretched between the arm 63 of the lever 64 and a fixed point of the frame 13. A spring 68 is stretched between the lever 62 and the arm 63 of the lever 64. The external profile of the cam 18, extending through 360°, comprises seven arcs of circumference 70, 71, 72, 73, 74, 75, 76, with their centres on the axis 55, of equal angular amplitudes, and with increasing radii, and a lobe 77 extending through an angular amplitude equal to the above. The arcs 70 to 76 are connected by ramps 70*a* to 75*a* which provide a constant radial increment between adjacent arcs.

The lobe 77 is composed of a ramp 78 determined by a radial increment equal to a multiple (e.g. 3-fold) of the radial increments between the preceding arcs, of a constant-radius track 79, and a decreasing-radius track 80 which joins the track 79 to the arc 70.

A positioner 81, composed of a lever 83 with one end having its fulcrum on the frame of the machine 13 and having at the other end a pivot 84 on which is pivoted a roller 85, cooperates, under the action of a spring 86 stretched between the lever 83 and a fixed point on the frame 13, by means of a roller 85 with the teeth of the saw-toothed wheel 60 in order to prevent the latter from rotating clockwise.

The pawl system 17 has, in the working phase, the following method of functioning, assuming an initial position corresponding to that indicated in FIG. 1, i.e. with the peg 66 at the beginning of the arc 70.

When rotation of the cam 18 counterclockwise brings the ramp 70*a* into collaboration with the peg 65, the lever 64 turns counterclockwise through a certain angle against the action of the spring 67.

The lever 62 is displaced upwards, being pulled by the spring 68 in such a way that the peg 61 rests in the gap between two teetch 60*a*, 60*b* thus making the wheel 60 and the platen 7 turn through a small angle and thereby producing an advance of the sheet by an elementary increment, equal to the distance between two adjacent rows of the matrix format. The same thing is repeated during engagement of the peg 66 with each of the other ramps 71*a* to 75*a*, while during engagement of the peg with the arcs 70 to 76 there is no variation in the position of the lever 64 and hence none also of the wheel 60.

Continuing the rotation of the cam 18, when the peg 66 engages with the ramp 78 which, as already stated, comprises a radial increment which is a multiple of those preceding, the lever 64 carries out a further rotation in the counterclockwise direction making the wheel 60 turn further counterclockwise by an angle equal to a multiple (3-fold in the example considered) of the preceding angular rotations, thus determining a corresponding advance of the sheet 4 which is thus positioned on a new typing line.

Thus when the peg 66, havingn passed over the constant-radius track 79, descends along the track 80 making the lever 64 turn clockwise, the peg 61 is constrained to climb the sloping side of the tooth 60*b*, against the action of the spring 68 until it goes over the crest and falls into the next tooth, corresponding to return of the peg 66 into the starting position.

One complete rotation of the cam therefore corresponds to advancing the sheet 4 by six elementary increments, for typing the rows of the matrix format of the characters of a row of print followed by a row increment, i.e. for the spacing between one row of characters and the next.

The synchronism between rotation of the shaft 55 and the shaft 44, ensured by suitable dimensioning of the diameters of the pulleys 45 and 46 and the ratio of the worm gear 56, 57, makes it possible to obtain advancement by one elementary increment of the sheet 4 for each single stroke of the slider 10. The time required for rotation of the cam through the angle of one of the arcs 70 to 76 or of the lobe 77, including the connecting ramps, therefore coincides with the half-period of oscillation of the slider.

The sensing device 22 comprises a disc 88 carrying two groups of five diametrically opposed notches 89 and 90, the five nothces of each group being spaced on a circumferential arc having an amplitude less than the angle of rotation of the shaft 44 required to ensure the travel of the slider 10 between one reversing point and the next (180°).

The notches are observed by a photoelectric device 91 of known type, designed to generate, in coincidence with the observation of a notch, a synchronous electrical impulse 92 (FIGS. 6 and 7) to be sent through a wire 114 to the electronic control system 30. The photoelectric device 91 is positioned relative to the disc 88 as shown in FIG. 1, in such a way that, when the slider 10 is in one of the two reversing points, there passes in front of it the mid part of one of the two sectors 89*a*, 90*a* of the disc 88, free from notches.

Each of the impulses 92 constitutes permission to print for the same matrix point for all the characters to be typed on the row of print. Since the shaft 44 finishes a complete rotation for each stroke of the slider 10, it is clear that each of the two groups of notches 89, 90 constitutes permission to print in succession all five points of a row of matrices for all the characters of a line of print. A row of points is typed while the slider carries out a stroke from right to left, and the next while the same carries out its next stroke from left to right.

The spacing between the notches of each group has to be calculated from the laws of movement of the slider, avoiding permission to print for the points in which the displacement of the slider relative to its central position is close to the maximum value, and e.g. by spacing the notches of each group on an angle well bellow 180°, it is possible to obtain good typing results even for a constant spacing between the five notches, due to the fact that these limited permissions to print occur at points in which the displacement of the slider from its central position as a function of time does not depart very much from a linear law.

A notch 93 is cut in the cam 18. The sensing device 27 of known type, for example photoelectric, is designed for noting the passage of the notch 93 in front of it and to generate, at the same time a synchronous electric signal 95 (FIG. 6) to be sent, through a wire 131, to the control unit 30. The frequency of this signal is obviously equal to the frequency of rotation of the cam 18. Since each complete rotation of the cam corresponds to the typing of a row of print on the sheet 4 and advancement of the latter on to a new printing line, the notch is positioned on the cam in such a way that every signal generated by the sensor 27 constitutes permission to print a new row of print by the circuit 30.

Figure 5:
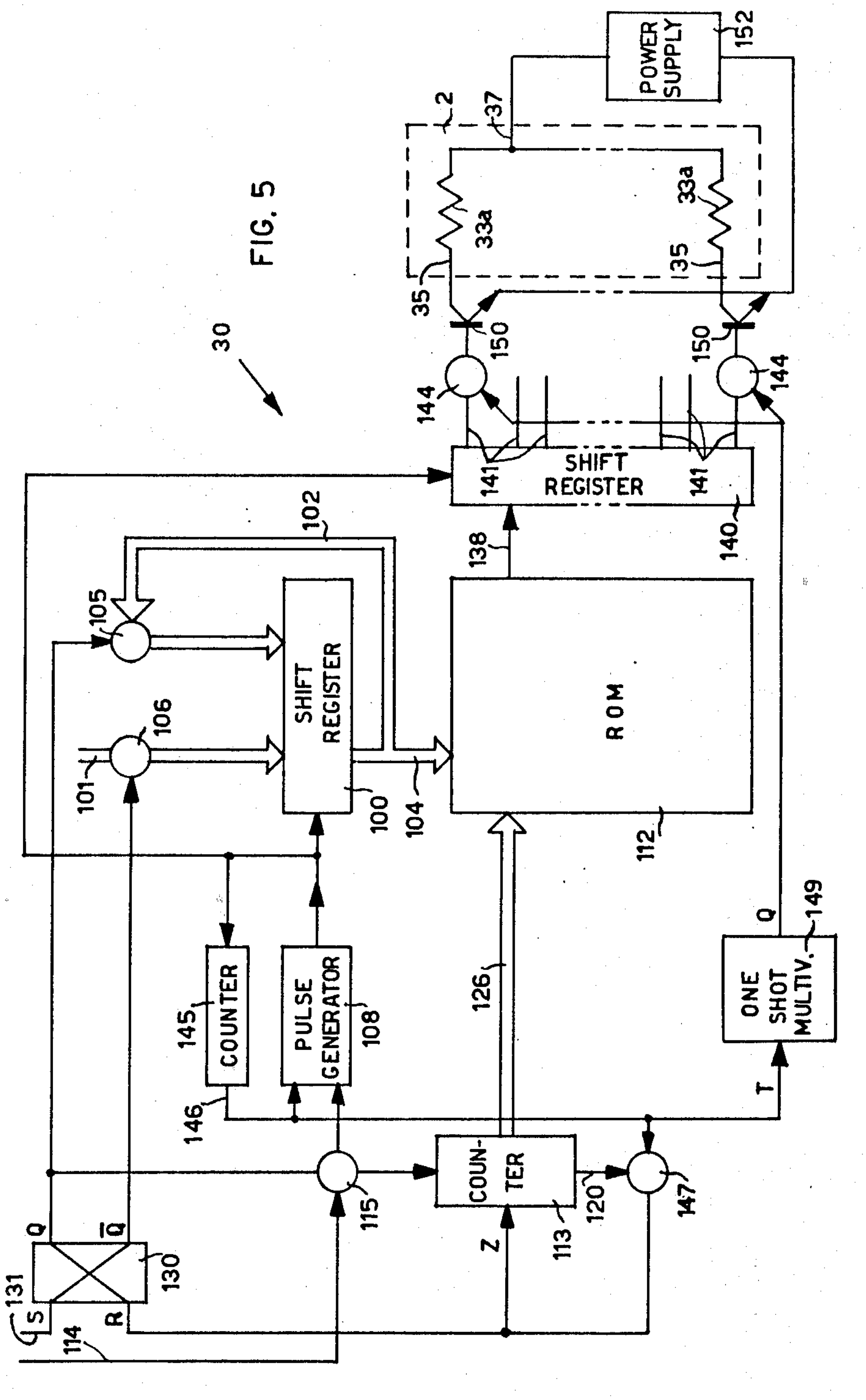
FIG. 5 is a block diagram of the electronic circuit for controlling the printing unit.

We shall now describe the electronic system for controlling the printer, shown according to a block diagram in FIG. 5. A register 100, known in itself, is designed to store the codes (e.g. of 6 bits) for the sixteen characters to be typed on a row of print, sent by the computer to which the printer is understood to be, for instance, connected on the channel 101. The present block diagram excludes the further connections between the computer and the electronic control system 30, designed to permit activation and deactivation of the printer by the computer and to synchronise the flow of data on to the channel 101, since they are known and do not constitute an object of the present invention.

The register 100 has a number of stages equal to the number of characters of a line of print, each stage being formed by as many bistable elements as there are bits in the codes of the characters (six in the example considered). The stages are interconnected to form six parallel shift registers so that information can be shifted from right to left in bit-parallel, character serial fashion.

The register has an exit channel 104 (of six bits in the example considered) connected to the outputs of its extreme left stage, which are, however, connected through a channel 102 and AND gates 105 to the inputs of the extreme right stage of the register.

The channel 101 can be enabled and disabled by means of AND gates 106. The register 100 is controlled by command signals 107 (FIG. 7) conveyed to it by a generator 108 of high frequency shift pulses and is permitted to oscillate in the presence of a signal 92 (FIG. 7) conveyed to it on the wire 114 through an AND gate 115. Coinciding with each of the shift pulses, the content of each stage of the register 100 is shifted into the stage next to the left, and simultaneously there is made to enter into the extreme right stage the code present on the enabled channel 102.

A binary counter 113, known per se, of capacity 35, is designed to count the synchronising impulses 92 sent to it on the wire 114 through the AND gate 115 from the sensor 22. Every so often the counter 113 reaches its maximum capacity, i.e. its stages assume the combination corresponding to the number 35 and it is designed then to generate a signal of logical level "1" on a wire 120.

Figure 8:
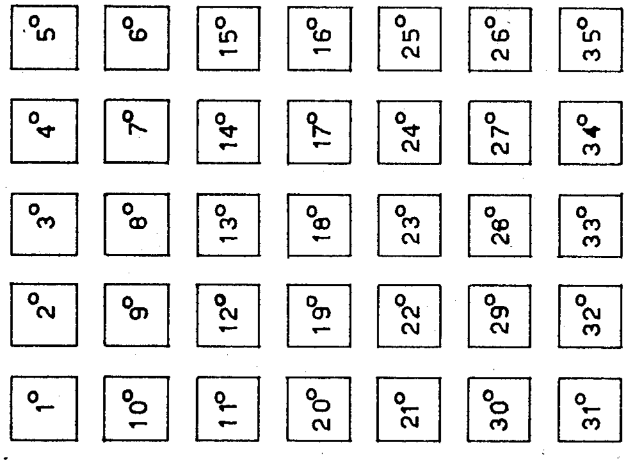
FIG. 8 shows a matrix format of points for typing characters with the printing unit.

The outputs of the counter 113 through the channel 126 are connected at the entrance of a read only memory (ROM) 112 of known type. The output channel 104 of the register 100 is also connected at the input to the ROM 112. In the ROM 112 there is stored information for determining whether or not a selected point of the matrix format is to be printed in the printing of a selected printable alphanumeric character. Each point of the matrix format is identified in the ROM by an ordinal number 1 to 35 according to the convention shown in FIG. 8.

Corresponding therefore to a particular character code sent to the input of the ROM 112 through the channel 104 of the register 100, and a particular point code (ordinal number of a matrix point according to the binary code of the counter 113) sent as input to the ROM 112 on the channel 126 of the counter 113, the ROM provides on the output channel 138 composed of a single wire, a logical level 1 if it is necessary to type the matrix point selected for formation of the required character, "0" in the contrary case.

A bistable flip-flop 130 is designend to be placed in its "set" condition (with the output Q at the logical level 1) by means of the signals 95 (FIG. 6) sent to its set input S by the sensor 27, through the wire 131. The output Q of the slip-flop 130, when it is at the logical level 1, activates the AND gates 105. The output $\overline{Q}$ (which is at 1 when Q is at 0) activates, when it is at the logical level 1, the AND gates 106.

The output channel 138 of the ROM is connected as input to the element at one end of a shift register 140, known per se, and composed of as many bistable elements as there are characters in a row of print (sixteen in the example considered here). The register 140 is shifted by the impulse 107 sent to it by the generator 108 which is connected to it. At each impulse the register 140 is designed to transfer the binary information carried by each bistable element on to the next element and then make the binary information carried on the channel 138 enter the end bistable element.

The outputs 141 of the bistable elements of the register 140 are connected as inputs to AND gates 144 whose outputs are connected to the base electrodes of drive transistors 150 each of which has its collector connected to the conductor 35 of a thermoelement 33*a* and the emitter connected to a power supply circuit 152. The common conductor 37 of the plate 10 is also connected to the circuit 152. The power supply circuit 152 is designed to apply between the conductor 37 and the emitters of the transistors 150 a suitable potential difference to make an electric current flow in the thermoelements 33*a* whose corresponding transistors 150 are, as will be seen later, rendered conductive.

The generator 108 also feeds a binary counter 145 of known type having a capacity equal to the number of characters in a row of print (sixteen in the example considered here). The counter 145 is incremented by the generator 108 by one unit for each impulse 107. On reaching its maximum capacity the counter 145 is designed to return to zero and to generate on and output wire 146 a signal which terminates oscillation of the generator 108.

The output wire 146 is connected, through an AND gate 147 opened by the logical signal present on the wire 120, to the reset terminal R of the flip-flop 130 and to the zeroing terminal Z of the counter 113, so that the logical signal generated by the counter 145 on reaching its maximum capacity causes, when the counter 113 has reached its maximum computation, reset of the flip-flop 130 and zeroing of the counter 113.

Figure 6:
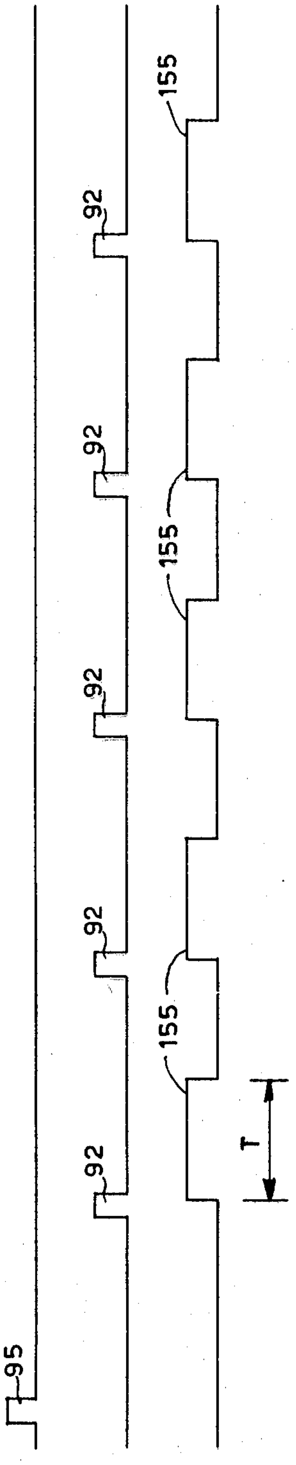
FIG. 6 is a time diagram of some logical signals generated by the control unit of FIG. 5.
Figure 7:
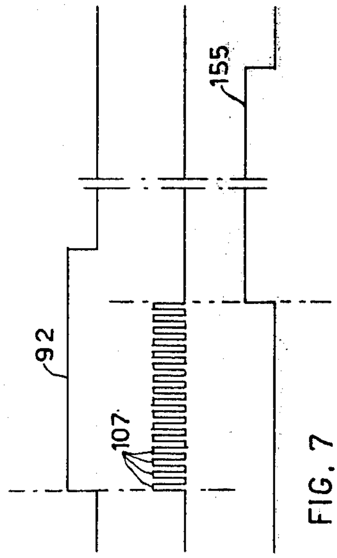
FIG. 7, is a time diagram of some logical signals generated by the control unit of FIG. 5 with a time scale enlarged compared with FIG. 5.

The output wire 146 is also connected as input to a monostable multivibrator 149 of known type, whose output Q is connected as input to each AND gate 144. The monostable multivibrator 149 is designed to generate in its output Q corresponding to every signal emitted by the counter 145 on the wire 146, an impulse 155 of logical level 1 having a suitable duration T (FIG. 6). The AND gates are thereby opened to transmit to the base terminals of the drive transistors 150 these impulses, only if the corresponding inputs 141 are at the logical level 1. The selected transistors 150 are ordered into conduction by the impulse 155 for the above-stated time T, and there is a circulation of current in the corresponding thermoelements 33*a*, leading to heating of the latter to a temperature high enough to produce a visible point imprint on the heat-sensitive recording medium 4.

In describing the method of functioning, the following working conditions are assumed:

1. Slider in the extreme left position with reference to FIG. 1.
2. Printer enabled by the computer to which it is connected, and codes for the characters to be typed on the next row of print already stored in the register 100.
3. Counters 113, 145 zeroed.
4. Flip-flop 130 in its reset condition (Q = 0).

When the notch 93 passes in front of the sensor 27 there is generated an impulse 95 (FIG. 6) on the wire 131 which forces the flip-flop 130 into its set position, thus opening the AND gates 105 and 115. The slider begins its course to the right and when the first notch of the disc 88 passes in front of the sensor 27 an impulse 92 is sent on the wire 114 which, through the gate 115, increases by one unit the counter 113.

The same impulse permits oscillation of the generator 108 which sends pulses 107. Each pulse 107 leads to an increase of one unit in the counter 145, and displacement by one stage to the left of the character codes stored in the register 100 and hence sequential presentation in the farthest left stage (and in the input to the ROM through the channel 104) of the character codes of all of the printing positions of a row, and their successive re-entry, through channel 102, into the extreme right stage.

Based on the character code at input and the code of the point position sent to the ROM respectively from the register 100 and the counter 113 (point 1°) the ROM furnishes at the output on the channel 138 a logical level 1 if, according to the matrix format, in the position of the selected point it is necessary to type a point for formation of the character in question, 0 in the contrary case.

The register 140 is also commanded by the pulses 107 during each of which it stores in the input end stage the logical level entering and moves the formation already stored one step on.

When the counter 145 has reached its maximum count the register 100 has the same initial configuration, the codes having returned to the starting position after having passed through all the stages. The register 140 carries in its bistable elements the information type or not type for each of the thermoelements 33*a*, and the corresponding AND gates 144 are allowed to open only if the logical level of the corresponding output 141 of the register 140 is 1.

As stated, the counter 145, having reached its maximum capacity, generates an impulse which stops the generator 108, zeroes the counter itself, and orders into conduction the permitted transistors, through the monostable multivibrator 149 for a definite time T, but in any case less than the time intervening between the passage of one notch and the next in front of the sensor 22, thus inducing the passage of current in the permitted thermoelements 33*a* and typing, in each printing position of the typing line of sheet 4, a point whose breadth in the direction of motion depends on the excitation time T and the velocity of the slider 10.

It is to be noted that the whole loading of the register 140 takes place at "electronic" velocity and therefore in a time which is extremely short relative to the mechanical movement of the slider. Even considering for the slider very high mechanical velocities, the above-stated time is only a minimal portion of the time intervening between the passage of one notch and the next of the disc 88 in front of the sensor 22. The same procedure is repeated for the passage of the next four notches in front of the sensor 22, and each time there is an increment of one unit in the counter 113 and the typing of one point of the first row of the matrix format for all characters of one row of print.

After the passage of the first group of five notches, the slider is at the end of its run to the right and gets ready to reverse its motion, and the roller 7 and hence the sheet 4 are advanced by an elementary step by the cam 18 and the pawl system 17. The functioning then proceeds as in the typing of the first row, and so also for the typing of all seven rows.

At the end of typing the seventh row and hence of the points 35, the counter 145 having reached its maximum capacity generates, as already seen, a reset signal through flip-flop 130, which bringing its output Q to zero, closes the AND gate 115 and inhibits computation by the counter 113, which is zeroed, and the starting of the generator 108.

At the end of typing the seventh row of the matrix format, the slider will be in the extreme right position and will carry out the next run towards the left without any typing operation. During this return run, the peg 66 engages with the lobe 77 of the cam 18 and makes the paper carry out the spacing necessary for positioning it on a new printing line, and the computer sends on channel 101 the character codes for typing on a new printing line, or, for example, the order to stop the printer.

At the end of each run the passage of the notch 93 in front of the sensor 27 will produce the setting of the flip-flop 130 and the beginning of the operation of typing for a new row of print.

It is to be understood that various modifications are possible within the scope of the claims. For example, a variant may be that of halving the number of thermoelements 33*a* present in the head, doubling the spacing between them and the amplitude of oscillation of the slider, and in such case with suitable modifications to the control circuit 30, it is possible to obtain during each stroke of the slider, from a single element, one of the rows of the matrix format of two adjacent characters of the row of print.

What I claim is:

1. An electrothermal printing unit for the non-impact printing of characters in accordance with a character matrix of dots on a thermosensitive recording medium comprising:

means for supporting said medium and for moving the medium incrementally along a first direction, a print assembly including a slidable member and a thermal print head mounted on said slidable member, said head having a plurality of energizable thermal printing elements arranged in a single row in a straight line of print perpendicular to said first direction, the space between two adjacent printing elements being equal, each of said printing elements being able to print a dot on the recording medium when energized, said slidable member being mounted for movement along said line of print with said elements in contact with the recording medium, means for transporting said slidable member in an oscillating motion through a plurality of printing strokes along said line of print, the amplitude of each stroke being at least equal to the distance between two adjacent elements, means for storing codes identifying a line of characters to be printed, means, responsive to said storing means, for selectively energizing said printing elements to print dots on the recording medium in the line of characters configuration during each printing stroke, each of said printing elements being operational to print a portion of a line of dots simultaneously with the printing of other portions of the line by the other printing elements, means coupled to said slidable member for sensing the position of said slidable member as it moves along said line of print and for enabling said selective energizing means to print dots on said recording medium only when said slidable member is in predetermined positions in its stroke across the medium, said means for moving the recording medium having means for advancing said medium along said first direction by a predetermined amount after each printing stroke across the medium for positioning said medium to receive another line of dots.

2. A printing unit according to claim 1, wherein the number of printing elements is equal to the number of characters printable in a line, said energizing means effecting a number of selective energizations of the printing elements during the printing of a line of characters equal to the number of dots of said matrix.

3. A printing unit according to claim 1, wherein said character matrix has columns and rows and said energizing means selectively energizes the printing elements during strokes of the head along said line of print in both directions, the said plurality of printing strokes being a number of consecutive strokes equal to the number of rows of the matrix.

4. An electrothermal printing unit for the non-impact printing of lines of characters, each line having a maximum predetermined number of character positions, each character being printed according to a character-matrix of points arranged in a plurality of rows, comprising:

means for supporting a heat sensitive record medium for moving the medium incrementally along a first direction, each increment positioning the medium to receive the printing of a different row of points of said character-matrix for all the characters of a line, a print head carrying a number of thermally activable printing elements equal to said maximum predetermined number and disposed in a single row and spaced apart at least the distance between two adjacent character positions, means mounting said head with the printing elements in contact with the recording medium and with said single row parallel to a second direction perpendicularr to said first direction and defining the line of print direction, means for reciprocating the head in said second direction during the printing of a line of characters, through a plurality of printing strokes, in synchronism with the movement of the recording medium, the amplitude of each stroke being at least equal to the distance between adjacent elements, means for signalling the position of the head during each printing stroke including a support, movable in synchronism with the head, carrying a plurality of markers thereon and a sensor device for sensing said markers and for generating corresponding electrical signals, means for storing codes deignating a line of characters to be printed, and control means responsive to said electrical signals and said storing means for selectively and simultaneously activating the printing elements a number of times equal to the number of points contained in a row of said matrix for each printing stroke of the head, whereby for each stroke each element selectively prints all the points of a row of the matrix of a character to be printed in the line.

5. A printing unit according to claim 4, wherein each of said elements has a thermo-activable printing surface substantially rectangular in shape, with the greater dimension perpendicular to the line of print direction and substantially equal to the height of the points of the matrix, the control means activating the elements for a sufficient time to form, with the movement of the head, substantially square matrix points.

6. A printing unit according to claim 4, in which the supporting means comprises a platen, a programming cam for rotating the platen and having an active profile with a series of first steps with constant rise and a second step with rise greater than the first steps, a cam-following element cooperating with the active profile to turn the platen incrementally to advance the recording medium through increments corresponding to the distance between two adjacent rows of the matrix, when it cooperates with the first steps, and to effect a rotation of the platen and advancement of the recording medium corresponding to an interline space between two rows of characters, when it cooperates with the second step.

7. A printing unit according to claim 6, wherein the reciprocating means comprise a speed motor and a crankshaft actuated by the motor, the head being mechanically connected to the crankshaft, the motor also actuating the programming cam.

* * * * *